United States Patent [19]

Hamanaga

[11] Patent Number: 4,696,454

[45] Date of Patent: Sep. 29, 1987

[54] VALVE SHIFTING MECHANISM FOR A BRASS INSTRUMENT

[75] Inventor: Shinji Hamanaga, Hamamatsu, Japan

[73] Assignee: Nippon Gakki Seizo Kabushiki Kaisha, Japan

[21] Appl. No.: 877,894

[22] Filed: Jun. 24, 1986

[30] Foreign Application Priority Data

Jun. 26, 1985 [JP] Japan ................................ 60-139899

[51] Int. Cl.[4] ...................... F16K 3/314; F16K 3/315; G10D 9/04

[52] U.S. Cl. .................................... 251/321; 251/325; 84/392

[58] Field of Search ........................ 251/325, 321, 324; 84/392

[56] References Cited

U.S. PATENT DOCUMENTS 1,716,917 6/1929 Carlson ........................... 251/324 X
1,922,685 8/1933 Johnson ................................ 84/392
3,044,339 7/1962 Greenleaf ............................. 84/392
3,911,784 10/1975 Shiono ................................. 84/392

*Primary Examiner*—Arnold Rosenthal
*Attorney, Agent, or Firm*—Ostrolenk, Faber, Gerb & Soffen

[57] ABSTRACT

In construction of a valve shifting mechanism for a brass instrument in which tube length is changed by selectively moving a piston tube in a valve casing against a spring, a valve guide made of synthetic resin is fixed, in sliding engagement with the valve casing, to a valve rod seat fixed to the piston tube by means of a piston rod screwed at one end into the piston rod seat for reduced generation of harsh noises when the valve is shifted and to simplify assemblage of the valve. An elongated slot is formed in the valve guide extending in the radial direction of the piston tube so as to permit a fixed size valve guide to be used with valve casings of different sizes.

4 Claims, 6 Drawing Figures

VALVE SHIFTING MECHANISM FOR A BRASS INSTRUMENT

BACKGROUND OF THE INVENTION

The present invention relates to a valve shifting mechanism for a brass instrument, and more particularly relates to a valve shifting mechanism with easily exchangeable parts and which produces a level of noise when operated and is therefore well suited for a trumpet or a like instrument.

Conventionally two types of valve shifting mechanisms have been used in trumpets to change the tonal pitch of the sound produced by the trumpet by changing the tube length of the trumpet in a stepwise manner. One such value is called an under spring type in which a spring for urging a piston tube is arranged under the tube. The other is called an upper spring type in which the spring is arranged above the tube.

One example of the conventional under spring type valve shifting mechanism includes a valve casing in the form of a tube open at both ends. This valve casing longitudinally accommodate a piston tube and a piston spring. The valve casing is provided with four radial bores spaced apart from each other both longitudinally and circumferentially for connection with the main tube and insert tubes. A longitudinal groove is formed in the inner face of the upper end of the valve casing in order to guide a valve guide. A top cover is screwed to the upper opening and a bottom cover is screwed to the lower opening of the valve casing, respectively. The piston tube has an outer diameter equal to or slightly smaller than the inner diameter of the valve casing to permit piston tube to slide smoothly in the valve casing without permitting air leakage. The piston tube is internally provided with three radial tubes corresponding to the radial bores in the valve casing. A piston rod seat is fixedly inserted into the upper opening and a spring seat is also fixedly inserted into the lower opening of the piston tube. The piston spring is interposed between the piston rod seat and the spring seat in order to urge the piston tube upwards.

A screw hole is formed through the center of the piston rod seat and a male screw formed at the bottom end of a piston rod is screwed into this screw hole. The top end of the piston rod projects upwards beyond the top cover of the valve casing and is provided with a presser cap.

The valve guide blocks the piston tube against axial rotation of the piston tube relative to the valve casing while allowing its longitudinal displacement. The valve guide is provided with a monolithic projection adapted to engage a recess formed in the top face of the piston rod seat near its periphery. A set screw is used to fix the engagement so that the projection is freely slidable in the longitudinal groove in the valve casing. A presser felt is interposed between the presser cap and the top cover and a piston felt is interposed between the top cover and the piston rod seat for absorption of mechanical shocks when the valve is operated.

The piston tube is normally held at the uppermost position by the piston spring so that the piston rod seat abuts the piston felt. When the presser cap is manually depressed under this condition, the piston tube moves downwards in the valve casing against the force of the piston spring and, depending on the extent of the movement, one of the radial tubes in the piston tube aligns with one of the four radial bores in the valve casing, thereby changing the valve length.

In this conventional valve shifting mechanism, the valve casing, the piston tube, the valve guide and the piston rod seat are all made of metal with the result that, harsh noises are generated due to frictional contact of the valve casing with the valve guide when the projection of the valve guide slides in the longitudinal groove in the valve casing.

Since the recess for the valve guide and the screw hole for the set screw have to be formed in the piston rod seat, a great deal of complicated labor is required to produce and assemble the piston rod seat. The same is true for the production of the piston tube since a groove has to be formed in the top end of the piston tube to accept the piston guide.

In another example of the conventional valve shifting mechanism, a metallic valve guide in the form of a ring is fixed atop a piston rod seat by means of a piston rod and a bent piece monolithically to the periphery of the valve guide is brought into engagement with a groove formed in the valve casing. No set screw is needed to fix the valve guide since the valve guide is fixed to the piston rod. Since, however, the valve guide is made of metallic material, valve shifting still generates harsh noises. Once a screw on the piston rod is inserted a center hole in the valve guide, the distance between the center of the piston rod and the bent piece is fixed. As a consequence, piston rods of different diameters can no longer be used, thereby seriously hampering apart exchangeability. In addition, the groove for the bent piece has to be formed in the top end of the piston tube, thereby making production complicated.

In the other example of the conventional valve shifting mechanism, a valve guide in the form of a pin is attached to the periphery of the top end of a piston tube and the top of the valve guide is brought into engagement with a groove formed in the valve casing. No set screw is needed as the valve guide is inserted by force into the piston tube. However, such force insertion tends to cause deformation of the piston tube. Since a metallic guide is used, shifting also generates harsh noises.

SUMMARY OF THE INVENTION

It is the object of the present invention to provide a valve shifting mechanism for a brass with high part exchangeability and low noise at shifting operation.

In accordance with the present invention in which tube length is changed by moving a piston tube slidably accommodated in a valve casing against the force of a piston spring, a piston rod seat is fixed to one end of the piston tube, a valve guide arranged on the piston rod seat is made of synthetic resin, a slot is formed in the center of the valve guide, a projection is formed on the valve guide on the longitudinal extension of the slot, the projection is slidably received in a groove formed in the valve casing, and the valve guide is fixed to the piston rod seat by screwing the screw on the piston rod into a screw hole in the piston rod seat past the slot in the piston guide.

DESCRIPTION OF THE PREFERRED EMBODIMENTS

Figure 1:
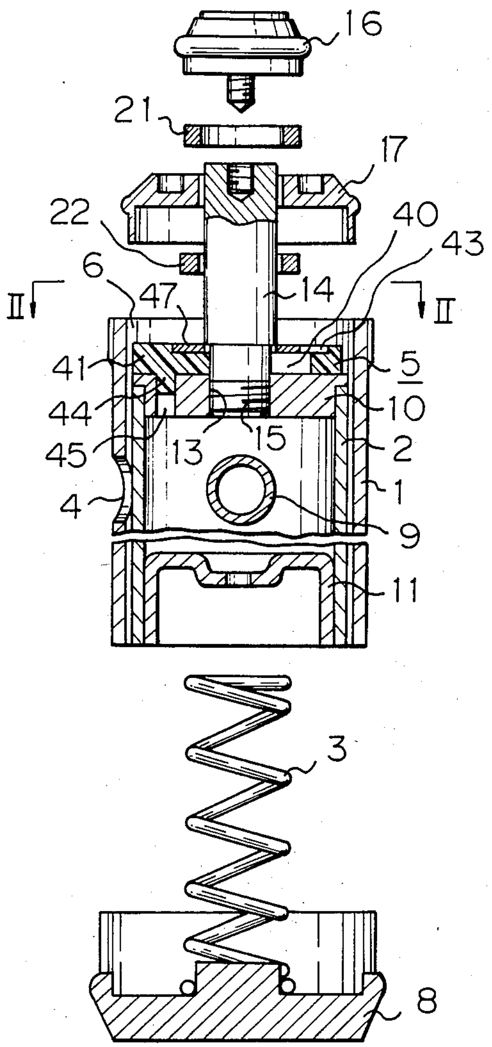
FIG. 1 is a side view, partly exploded and partly in section, of one embodiment of the valve shifting mechanism in accordance with the present invention.
Figure 2:
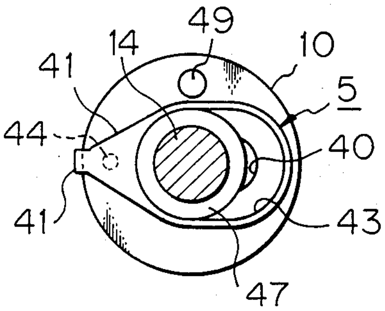
FIG. 2 is a sectional view taken along a line II—II in FIG. 1, FIGS. 3A and 3B are plan and side sectional views of a valve guide used for another embodiment of the valve shifting mechanism in accordance with the present invention.

One embodiment of the valve shifting mechanism in accordance with the present invention is shown in FIGS. 1 and 2, in which the valve shifting mechanism includes, like the conventional construction a valve casing 1 which accommodates a piston tube 2 and a piston spring 3. The valve casing 1 takes the form of a tube open at both ends and provided with four radial bores 4 (only one of which is shown in FIG. 1) spaced apart from each other in both the longitudinal and circumferential directions. The top end of the valve casing 1 is closed by a top cover 17 and the bottom end by a bottom cover 8. The outer diameter of the piston tube 2 is almost equal to or slightly smaller than the inner diameter of the valve casing 1 so that the piston tube 2 can slide longitudinally in the valve casing 1 without air leakage. The piston tube 2 is internally provided with three radial tubes 9 (only one of which is shown in FIG. 1). for selective communication with the radial bores 4 in the valve casing 1. A piston rod seat 10 is fixedly inserted into the upper opening of the piston tube 2 and a spring seat 11 is fixedly inserted into its lower opening. The piston spring 3 is interposed between the bottom cover 8 and the spring seat 11 in order to normally urge the piston tube 2 upwards.

A screw hole 13 is formed in the center of the piston rod seat 10 for screw engagement with a male screw 15 formed at the bottom end of a piston rod 14. The top end of the piston rod 14 projects beyond the top cover and is accompanied with a presser cap 16 screwed thereinto. A presser felt 21 is interposed between the presser cap 16 and the top cover 7 and a piston felt 22 is interposed between the top cover 7 and a valve guide 5.

With this construction, the piston tube 2 is normally maintained at the highest position by the piston spring 3 and the valve guide 5 is kept in pressure contact with the piston felt 22. When the presser cap 16 is manually depressed, the piston tube 2 moves downwards in the valve casing 1 so that, depending on the extent of the downward movement, one of the radial tubes 9 in the piston tube 2 is brought into communication with a corresponding one of the radial bores 4 in the valve casing 1 to change the tube length.

In accordance with the present invention, the valve guide 5 is made of synthetic resin and a slot 40 is formed in the center thereof. The valve guide 5 includes radial projection 41 which extends in the longitudinal direction of the slot 40. More specifically, the radial projection 41 extends along the longitudinal center axis of the slot 40. A depression 43 is formed in the top face of the valve guide 5 almost in a concentric relationship to the slot 40. The radial projection 41 of the valve guide 5 is provided with a bottom projection 44 which is received in a recess 45 formed in the piston rod seat 10 to correctly position the valve guide 5 on the piston rod seat 10 and therefor relative to the piston tube 2. The male screw 15 of the piston rod 14 is screwed into the screw hole 13 in the piston rod seat 10 clamping a washer 47 located in the depression 43. In this fixed state of the valve guide 5, the radial projection 41 of the valve guide 5 is slidably received in a longitudinal groove 6 formed in the inner face of the valve casing 1 in order to lock the piston tube 2 against axial rotation relative to the valve casings.

Figure 3A:
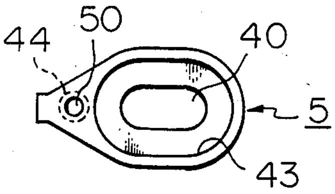
Figure 3B:
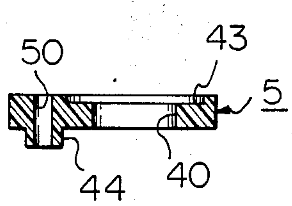

An air vent 49 is formed through the piston rod seat 10 at a position not covered by the valve guide 5. Alternatively, the recess 45 in the piston rod seat 10 (FIG. 1) may cooperate with a through hole 50 (FIGS. 3A and 3B) formed in the bottom projection 44 of the valve guide 5.

Since the valve guide 5 is made of synthetic resin, no significantly harsh noises are generated when its projection 41 slides in the longitudinal groove 6 in the valve casing 1 during valve shifting.

Figure 4:
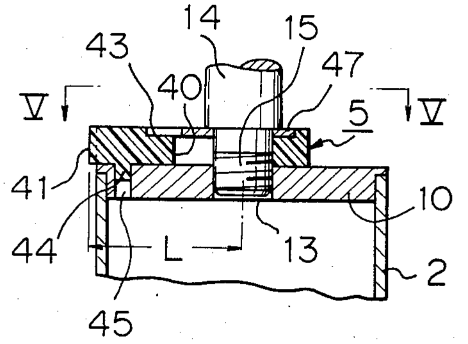
FIG. 4 is a side sectional view of the other embodiment of the valve shifting mechanism in accordance with the present invention.
Figure 5:
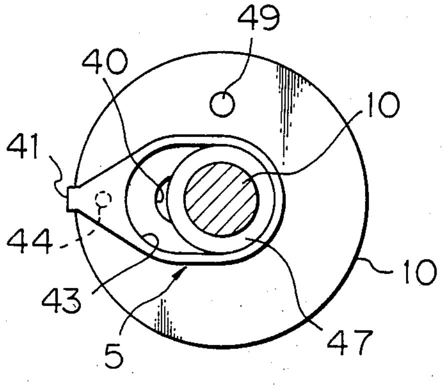
FIG. 5 is a sectional view taken along a line V—V in FIG. 4.

FIGS. 4 and 5 depict another embodiment of the valve shifting mechanism in accordance with the present invention in which the distance L between the center axis of the screw hole 13 and the distal end of the radial projection 41 is large due to the large diameter of the piston rod 14. Even in this case, the presence of the slot 40 allows troubleless engagement of the male screw 15 of the piston rod 14 with the screw hole 13. This flexibility makes it possible to use the valve guide 5 of fixed size with piston tubes of different diameters. The lubricative nature and light weight of the synthetic resin greatly reduces friction between the valve guide 5 and the valve casing 1, thereby allowing smooth movement of the piston tube 2. Since the valve guide 5 is fixed to the piston rod seat 10 by means of piston rod 14 without use of any set screw, assemblage of the valve is greatly simplified.

I claim:

1. A valve shifting mechanism for a brass instrument, said mechanism comprising:
   - a generally cylindrical tubular valve casing closed at both ends and provided, in its inner face, with a longitudinal groove;
   - a generally cylindrical piston tube coaxial with and slidably accommodated in said valve casing;
   - means fur urging said piston tube towards one closed end of said valve casing;
   - a piston rod seat attached to one end of said piston tube near said one closed end of said valve casing;
   - a valve guide made of synthetic resin and provided with an elongated slot extending in the radial direction of said piston tube and a radial projection which extends along a longitudinal center axis of said slot, said radial projection being in slidable engagement with said longitudinal groove in said valve casing; and
   - a piston rod attached at one end to said piston rod seat and extending through said one closed end of said valve casing and said slot in said valve guide so as to fix said valve guide to said piston rod seat.

2. A valve shifting mechanism as claimed in claim 1 in which
   - said valve guide is provided with a bottom projection which is received in a corresponding recess in said piston rod seat for correct positioning of said valve guide on said piston rod seat.

3. A valve shifting mechanism as claimed in claim 2 in which
   - said piston rod seat is provided with an air vent.

4. A valve shifting mechanism as claimed in claim 2 in which
   - said recess in said piston rod seat is provided with a through hole and cooperates with a corresponding through hole formed in said bottom projection of said valve guide to define an air vent.

* * * * *